United States Patent [19]

Ammar

[11] 4,108,103
[45] Aug. 22, 1978

[54] UNIT CONVERSION LABEL

[76] Inventor: Felix Ammar, 130 Sylvan Ave., Scarborough, Ontario, Canada

[21] Appl. No.: 814,739

[22] Filed: Jul. 11, 1977

[51] Int. Cl.² ............................................. G01P 1/08
[52] U.S. Cl. ................................ 116/116; 116/129 T; 116/DIG. 47; 283/21
[58] Field of Search ................. 283/21; 116/DIG. 47, 116/116, 129 T, 129 F, 129 E, 129 R, 129 A, 129 K; 73/488, 489; 428/42, 202, 204, 206, 207

[56] References Cited

U.S. PATENT DOCUMENTS

| 2,810,362 | 10/1957 | Lindheim | 116/116 |
| 4,054,105 | 10/1977 | Fegan | 116/129 T |

FOREIGN PATENT DOCUMENTS 1,251,425  10/1971  United Kingdom ............ 116/DIG. 47

Primary Examiner—Frank T. Yost

[57] ABSTRACT

An adhesive label for the application of kilometer per hour speed values to a speedometer bearing miles per hour indicia bears two sequences of numerical indicia, one being speed values in miles per hour and the other being corresponding values in kilometers per hour. The front sheet of the label has an adhesive coating protected by a peelable backing sheet and is severed to permit peeling from the backing sheet of separate portions of that front sheet, each such portion bearing a kilometers-per hour value and optionally a corresponding miles per hour value so that each such portion can be applied to a speedometer cover glass in an appropriate position. Usually, the front sheet of the label is severed or perforated between the two sequences of indicia. Alternatively, the miles per hour indicia can be printed on the backing sheet so as to be visible through a transparent front sheet.

13 Claims, 7 Drawing Figures

UNIT CONVERSION LABEL

BACKGROUND OF THE INVENTION

The present invention relates to adhesive labels and more particularly to multi-purpose numerical conversion labels which are especially intended to be utilized on vehicle speedometers bearing indicia representing speeds in miles per hour so as then to provide an indication of equivalent speeds in kilometers per hour.

With the ever increasing adoption of the metric system and the introduction of sign posts showing speed limits on public roads in kilometers per hour, the owners of existing vehicles, such as automobiles, vans, trucks, motor cycles and the like, fitted with speedometers showing speeds in only miles per hour face the potential difficulty of not being certain of whether or not they are exceeding the indicated speed limit. The appreciation of this problem has resulted in numerous proposals for converting such existing miles per hour speedometers. The existing proposals have, however, presented certain practical disadvantages. For example, the wide variety of sizes and shapes of existing speedometers has meant that, if a one-piece transparent decal or label is to be provided for application over the cover glass of a speedometer, then a very large number of different labels in all shapes and sizes must be provided.

It is a principal object of this invention to provide an adhesive label which can be utilized on a wide range of existing speedometers regardless of their shapes and sizes.

Yet another object of this invention is to provide an adhesive label for the aforesaid purpose and which label is simple in its structure and therefore, relatively inexpensive to manufacture.

A further object of this invention is to provide an adhesive label for the aforesaid purpose and which can be applied without any great effort to an existing speedometer cover glass.

Other objects of the invention will become apparent as the description herein proceeds.

SUMMARY OF THE INVENTION

The present invention provides a multi-purpose numerical conversion label which can broadly be defined as comprising a planar sheet bearing a first sequence of numerical indicia; an adhesive coating on a rear surface of said planar sheet; and a backing sheet peelably underlying said adhesive coating, said planar sheet being severed between each pair of indicia of said first sequence of indicia to permit ready peeling from said backing sheet of a plurality of portions of said planar sheet, each such portion bearing a single indicium of said first sequence, a second sequence of numerical indicia being provided on said label with the indicia of said second sequence in alignment with respective ones of the indicia of said first sequence and each having a predetermined constant mathematical relationship with the aligned indicium of said first sequence, and each indicium of said first and second sequences being visible on observation of said front surface of said planar sheet.

When intended for use on a speedometer having existing miles per hour speed indicia, the indicia of the first sequence provided on such a label will represent speeds expressed in kilometers per hour while the indicia of the second sequence will represent the equivalent speeds expressed in miles per hour.

In one embodiment of a label in accordance with this invention, both the first and second sequences of indicia are provided on the front sheet of such a label and that front sheet is served to permit the ready peeling from the backing sheet of a plurality of portions of said planar front sheet, each such portion bearing a single indicium of said first sequence.

In another embodiment of a label in accordance with this invention, each such portion of the planar front sheet bears, not only a single indicium of the first sequence but also an aligned indicium of the second sequence. Such a portion of the planar front sheet of such a label may, if desired, be partially severed between said first and second sequences of indicia to permit separation of a sub-portion of said sheet bearing a single indicium of said first sequence from a sub-portion of said sheet bearing a single aligned indicium of said second sequence after peeling of said sub-portions jointly as a single portion from said backing sheet.

In another embodiment of a label in accordance with this invention, the indicia of the first sequence are provided on either surface of a transparent planar front sheet of such a label while the indicia of the second sequence are provided on the front surface of the backing sheet of such a label so as to be visible through the front sheet merely for reference purposes.

This invention also broadly embraces speedometers having attached thereto portions of a label as hereinbefore defined.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
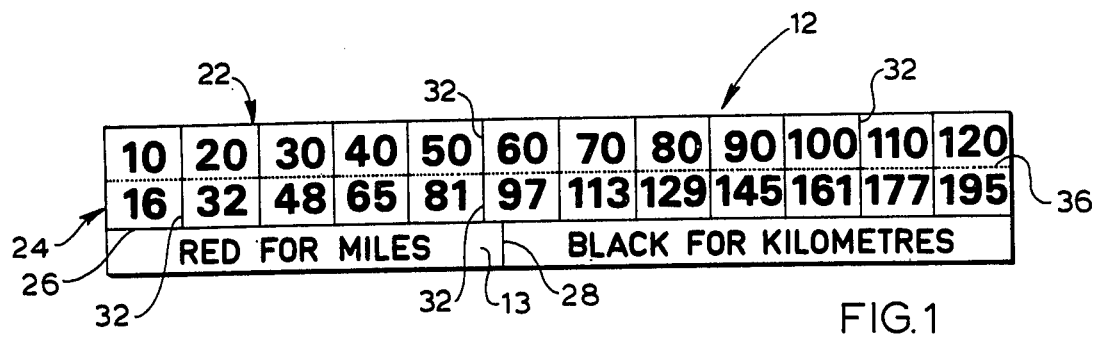
FIG. 1 is a plan view of one embodiment of a numerical conversion label in accordance with this invention.
Figure 2:
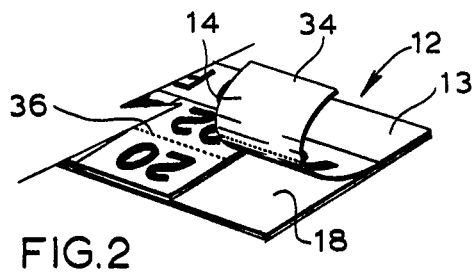
FIG. 2 is a fragmentary perspective view of the label shown in FIG. 1 and showing the peeling from the backing sheet of one portion of the front sheet of the label.

Referring first to FIGS. 1 and 2 of the accompanying drawings, it will be seen that there is indicated in those figures generally by the legend 12 one embodiment of a numerical conversion label in accordance with this invention. The label 12 comprises a planar front sheet 13 which is preferably of translucent or transparent plastics material and which is provided on its rear surface (FIG. 2) with an adhesive coating 14. A backing sheet 18 covers and protects the adhesive coating 14 in a conventional manner.

On the front surface of the front sheet 13, there is printed a first sequence of indicia representing numerical speed values expressed in kilometers per hour. Such first sequence of indicia is generally indicated by the legend 24. Also printed on the front surface of the front sheet 13, is a second sequence of indicia representing numerical speed values expressed in miles per hour. Such second sequence of indicia is generally indicated by the legend 22. As will be readily understood from FIG. 1, each indicium of the second sequence 22 is aligned with a corresponding indicium of the first sequence 24 and each of the two indicia of an aligned pair represent the same speed value, that of the second sequence giving the value in miles per hour and that of the first sequence giving the equivalent value in kilometers per hour.

In accordance with one useful but optional feature of this invention, the indicia of the first sequence 24 are printed on the front sheet 13 in a first colour and the indicia of the second sequence 22 are printed on the front sheet 13 in a different second colour. For the sake of this description, it will be assumed that the indicia of the first sequence 24 are printed in black and that the indicia of the second sequence 22 are printed in red.

Referring further to FIG. 1, it will be seen that the front sheet 13 of the label 12 also has printed on its front surface, for a purpose yet to be explained, the following wording "RED FOR MILES BLACK FOR KILOMETERS".

The front sheet 13 of the label 12 is severed at 26 from end to end below the first sequence 24 of indicia and vertically at 28 between the printing "RED FOR MILES" and the printing "BLACK FOR KILOMETERS" so permitting the peeling from the backing sheet 18 of two separate labels bearing such printing.

The front sheet 13 is also severed as indicated at 32 between each pair of indicia of both the first and second sequences respectively to permit the separate peeling from the backing sheet 18 of separate portions 34 of the front sheet 13, each such portion 34 bearing a single indicium of the first sequence 24 and an aligned and corresponding indicium of the second sequence 22 as is actually shown in FIG. 2.

For a purpose yet to be explained, the front sheet 13 is also usefully partially severed, for example, by scoring or perforation, from end to end as indicated at 36 between the first and second sequences 24 and 22 respectively.

Figure 4:
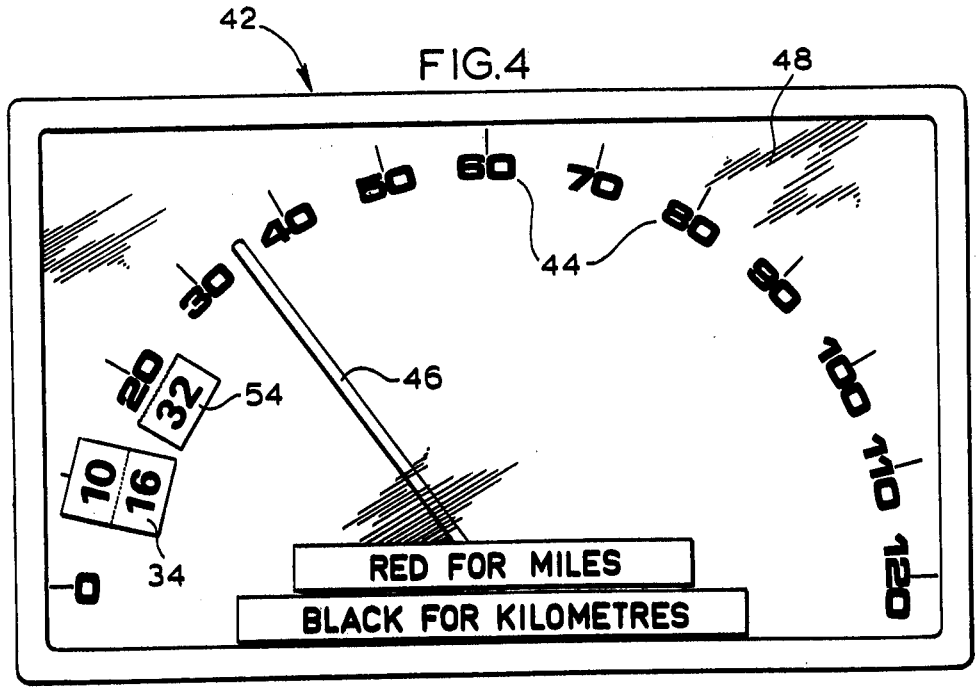
FIG. 4 is a front elevation of a speedometer having labels applied thereto in accordance with this invention.

Having described the structure of the label 12, the manner in which such label is used on a speedometer will now be considered with reference to FIG. 4 of the accompanying drawings. The speedometer 42 illustrated in that figure is of conventional construction and comprises a panel on which are provided mutually spaced indicia 44 representing numerical speed values expressed in miles per hour. The speedometer 42 comprises an indicating needle 46 which, in use, moves relative to the indicia 44. A transparent cover glass 48 protects the speedometer mechanism while permitting observation of the needle 46 and the indicia 44.

In accordance with one feature of this invention, a portion 34 of the front sheet 13 of the label 12 is peeled from the backing sheet 18 and applied to the cover glass 48 so as to become adhesively bonded to that cover glass 48, such portion 34 being applied over or in alignment with that one of the existing speedometer indicia corresponding to the acutal miles per hour value on that particular label portion 34.

It will now be understood that, after such label portions have been applied to the speedometer cover glass 48 for every one of the existing speedometer indicia 44, a driver will be able to note instantaneously from the position of the needle 46 the speed of his vehicle in both miles per hour and kilometers per hour by referring to a respective one of the two indicia on the relevant label portion 34. The speedometer light will illuminate the numerals.

To reduce the risk of confusion, the aforementioned label bearing the printing "RED FOR MILES" and "BLACK FOR KILOMETERS" may be positioned on or near the speedometer 42. In FIG. 4, such labels are shown as being fixed on a lower part of the speedometer cover glass 48.

Figure 3:
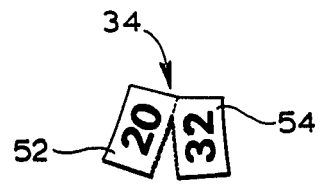
FIG. 3 is a plan view showing the separation of two sub-portions of the sheet portion shown in FIG. 2.

As already indicated, the front sheet 13 of the label 12 is usefully partially severed as indicated at 36 between the two sequences 22 and 24. By providing such partial severing, each label portion 34 can, if desired, be separated into two parts or sub-portions 52 and 54 as shown in FIG. 3 so that only sub-portion 54 indicating a speed value in kilometers per hour need be attached to the speedometer 42 as is also shown in FIG. 4. In this particular use of a label in accordance with this invention, the existing indicia 44 of the speedometer 42 are still used to indicate speeds in miles per hour while the label sub-portions 54 indicate the corresponding kilometers per hour values.

Numerous variations in and modifications of the label structure already described are possible. For example, while the label 12 has been described as having a front sheet 13 formed of translucent plastics material, such front sheet 13 can be formed of other materials, such as paper, metals or leather, and may be transparent, translucent or opaque. If the front sheet 13 is sufficiently transparent, the indicia can be printed on its rear surface.

It will also be understood that the use of the label 12 is not restricted by the shape of the speedometer cover glass and can equally be used on speedometers with cover glasses which are square, rectangular, circular or any other shape.

While there may be some advantage in providing labels such as the label 12 with indicia of a few different sizes for use on speedometers of different sizes, it would appear at this time that one standard size label might well be suitable for use on the great majority of existing speedometers.

If desired, the indicia 22 and 24 provided on a label 12 in accordance with this invention can be of different sizes to render one or the other of such indicia more conspicuous.

While the invention has been described with particular reference to the provision of a multi-use label for converting speedometers, it will be appreciated that such labels can also be used for the numerical conversion of any instrument of a similar type.

In accordance with another variation of the structure hereinbefore specifically described, the planar sheet 13 of the label 12 may be completely severed between the first and second sequences 24 and 22 respectively so that each of the portions peeled from the backing sheet 18 bears only a single kilometers per hour indicium of the first sequence 24.

Figure 5:
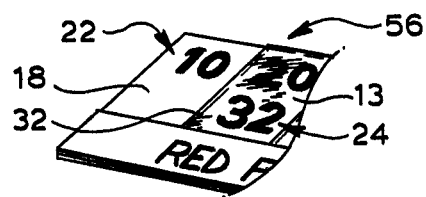
FIG. 5 is a fragmentary perspective view of an alternative embodiment of a numerical conversion label in accordance with this invention.
Figure 6:
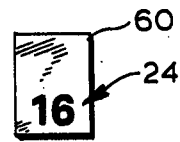
FIG. 6 is a plan view of one portion of the front sheet of the label shown in FIG. 5

Reference will next be made to FIGS. 5 and 6 of the accompanying drawings in which there is indicated generally and fragmentarily at 56 an alternative embodiment of a label in accordance with this invention. The label 56 is generally similar to the label 12 in that it comprises a front sheet 13 with an adhesive backing and a backing sheet 18 and in that the first sequence 24 of numerical indicia, representing speeds in kilometers per hour, is printed on the front sheet 13 but differs from the label 12 in that the second sequence 22 of numerical indicia, representing the same speeds in miles per hour, is printed on a front surface of the backing sheet 18. The front sheet 13 is again severed as at 32 between each adjacent pair of indicia of the first sequence 24 so permitting the removal by peeling from the backing sheet 18 of portions 60 of the front sheet 13 so that each such portion (FIG. 6), intended for application to a speedometer, bears a single kilometers per hour indicium with the miles per hour indicia of the second sequence 22 on the backing sheet 18 being used only for identification purposes.

Figure 7:
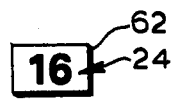
FIG. 7 is a plan view of a label portion similar to that shown in FIG. 6 as peelable from yet another embodiment of a label in accordance with this invention.

Reference is finally made to FIG. 7 of the drawings and which figure shows a portion 62 of the front sheet of a label similar to that shown in FIG. 5 but in which the front sheet 13 thereof is severed so that those parts of that front sheet which overlie the miles per hour indicia of the second sequence 22 on the backing sheet 18 remain in position when the portions 62 are peeled from that backing sheet 18.

It will be understood that, for the embodiments shown in FIGS. 5, 6 and 7, the front sheet 13 of the label 56 will need to be sufficiently transparent to permit the miles per hour indicia of the second sequence 22 to be visible therethrough.

While the invention has hereinbefore been specifically described with reference to the particular embodiments thereof as shown in the accompanying drawings, it will be understood that numerous other variations are possible. The foregoing description is given here by way of example only and this invention is not to be taken as limited to any of the specific features as described but comprehends all such variations thereof as come within the scope of the appended claims.

The embodiments of the invention in which an exclusive property of privilege is claimed are defined as follows:

1. A multi-purpose numerical conversion label which comprises; a planar sheet bearing a first sequence of numerical indicia, an adhesive coating on a rear surface of said planar sheet, and a backing sheet peelably underlying said adhesive coating, said planar sheet being severed between each pair of indicia of said first sequence of indicia to permit ready peeling from said backing sheet of a plurality of portions of said planar sheet, each such portion bearing a single indicium of said first sequence, a second sequence of numerical indicia being provided on said label with the indicia of said second sequence in alignment with respective ones of the indicia of said first sequence and each having a predetermined constant mathematical relationship with the aligned indicium of said first sequence and each indicium of said first and second sequences being visible on observation of said front surface of said planar sheet.

2. A multi-purpose numerical conversion label as claimed in claim 1, in which said planar sheet is of a transparent plastics material and in which said indicia of said second sequence are provided on a front surface of said backing sheet so as to be visible through said planar sheet.

3. A multi-purpose numerical conversion label as claimed in claim 2 and in which the indicia of said first sequence represent speeds expressed in kilometers per hour and the indicia of said second sequence represent the equivalent speeds expressed in miles per hour.

4. A multi-purpose numerical conversion label as claimed in claim 1 and in which said indicia of both of said first and second sequences are provided on said planar sheet.

5. A multi-purpose numerical conversion label as claimed in claim 4 and in which said planar sheet is also severed between each pair of indicia of said second sequence so that each said portion of said planar sheet peelable from said backing sheet bears both a said single indicium of said second sequence and an aligned indicium of said first sequence.

6. A multi-purpose numerical conversion label as claimed in claim 5 and in which the indicia of said first sequence represent speeds expressed in kilometers per hour and the indicia of said second sequence represent the equivalent speeds expressed in miles per hour.

7. A multi-purpose numerical conversion label as claimed in claim 6 and in which said second sequence of indicia comprises at least some of the following indicia; 10, 20, 30, 40, 50, 60, 70, 80, 90, 100, 110 and 120.

8. A multi-purpose numerical conversion label as claimed in claim 7 and in which said indicia of said first sequence are printed on said planar sheet in a first colour and said indicia of said second sequence are printed on said planar sheet in a different second colour.

9. A multi-purpose numerical conversion label as claimed in claim 8 and in which said planar sheet is further severed to provide at least one separate sheet portion bearing printing in said first colour indicating that the indicia of said first sequence as printed in said first colour represent speeds in kilometers per hour and printing in said second colour indicating that the indicia of said second sequence as printed in said second colour represent speeds in miles per hour.

10. A multi-purpose numerical conversion label as claimed in claim 6 and in which said planar sheet is partially severed between said first and second sequences of indicia to permit separation or a sub-portion of said sheet bearing a single indicium of said first sequence from a sub-portion of said sheet bearing a single aligned indicium of said second sequence after peeling of said sub-portions jointly as a single portion from said backing sheet.

11. A speedometer having a sequence of mutually spaced miles per hour speed indicia provided thereon, an indication movable past said indicia to indicate the speed of a vehicle fitted with such a speedometer, and a plurality of separate labels adhesively bonded to said speedometer in alignment with respective ones of said speed indicia and each bearing a corresponding kilometers per hour speed indicium.

12. A speedometer as claimed in claim 11 and in which each said label also bears a corresponding miles per hour speed indicium.

13. A speedometer as claimed in claim 12 and in which said miles per hour and kilometers per hour speed indicia are printed on said labels in two different colours.

* * * * *